United States Patent Office 3,288,684
Patented Nov. 29, 1966

3,288,684
LIQUID MIXTURES OF THIOUREAS
John L. Eaton, Grosse Ile, Mich., assignor to Pennsalt Chemicals Corporation, Philadelphia, Pa., a corporation of Pennsylvania
No Drawing. Filed Nov. 19, 1963, Ser. No. 324,841
4 Claims. (Cl. 252—391)

This invention relates to liquid mixtures of thioureas and to methods for their manufacture.

As is well known in the art dialkylthioureas of the structure

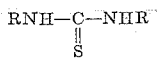

may be prepared by reacting a monoalkyl amine with carbon disulfide to form the dithiocarbamate amine salt and heating to split off hydrogen sulfide in accordance with the following equations:

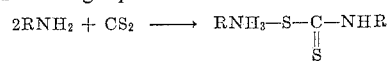

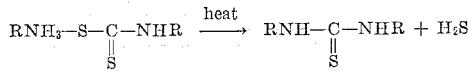

Certain of the lower dialkylthioureas, in particular diethyl- and dibutylthioureas, have been produced commercially for a number of years and currently find use as inhibitors of corrosion in acidic systems and as antiozonants in the compounding of elastomers. Practically all of the $C_1$ to $C_8$ dialkylthioureas are solids at ordinary temperatures, e.g. diethylthiourea has a melting point of about 77° C. and dibutylthiourea has a melting point of about 66° C.

In connection with the above-mentioned uses, there has been a longfelt need for alkylthioureas in liquid form. As compared to the solids now available, liquids are more easily measured, and more readily dispersed. Also, liquids may be included in admixtures with other ingredients with minimal danger of separation during storage or transportation. The need for alkylthioureas in liquid form has led to efforts to attain this result by physical mixing, but such efforts have been unsuccessful without the addition of unwanted solvents or non-alkylthiourea fluxing agents. For example, the minimum crystallization temperature to which blends of diethyl- and dibutylthioureas can be formulated by physical mixing is about 42° C.

The present invention permits the preparation and application of low melting, normally liquid dialkylthiourea mixtures in which each of the alkyl groups contains two or four carbon atoms. That is, alkylthiourea mixtures in which the predominant alkyl groups are ethyl and normal butyl.

The most valuable mixtures of the present invention in respect to freeze resistance are obtained by concurrently reacting approximately equal molar quantities of monoethylamine and monobutylamine with approximately stoichiometric quantities of carbon disulfide, and heating the resulting reaction product to split off hydrogen sulfide.

The mixtures so obtained remain liquid indefinitely at room temperature and crystallize very slowly, if at all, during prolonged storage at about 0° C.

The reason for the extreme reduction in melting point as compared to the melting points of diethyl- and dibutylthiourea is not readily apparent. This reduction is greatly in excess of that which could ordinarily be attained with eutectic or nearly eutectic mixtures of organic solids. Also, the ratio of monoethylamine to monobutylamine is surprisingly critical. As demonstrated in the examples which appear at the end of this application, the mixtures produced utilizing a 1:3 molar ratio of ethylamines to butylamines crystallize much more rapidly at low temperature than do mixtures produced by use of a 1:1 ratio.

A further unexpected feature of the practice of the present invention is the critical number of carbon atoms in the alkyl groups on the alkylamines used in the preparation. Ethyl- and normal butylamines have been found greatly superior for the purpose.

As shown in Example 4, isopropylamine, when reacted with butylamine, gives a mixture which solidifies on standing for a few hours at room temperature. As shown in Example 5, isopropylamine when reacted with ethylamine forms a reaction mass which rapidly becomes solid and cannot be stirred.

Amines are frequently available in mixtures and it should be understood that minor amounts of other alkyl or arylamines can usually be tolerated in the practice of the invention without seriously affecting the desirable liquidity of the product, so long as the product consists essentially of the mixtures of the present invention.

It appears probable that a meta-stable system is formed by the practice of the present invention, and that both lowering of the true crystallization temperature and lengthening of time required for crystallization are involved. However, the crystallization characteristics of multicomponent systems are often very complex and unpredictable, and the present invention should not be considered to be limited by any such hypothesis. The value of the invention lies in the liquidity of the mixtures produced.

A more detailed comparison of the melting point of the mixtures of the present invention with the melting points of pure alkylthioureas is shown in Table 1.

TABLE 1

| Alkylthiourea: | Melting point (° C.) |
| --- | --- |
| Di-tertiary amyl | 103 |
| N-sec-amyl-N'-tertiary amyl | 68 |
| N-t-amyl-N'-isobutyl | 77–78 |
| Diisobutyl | 87 |
| Di-sec-butyl | 108 |
| Dioctyl | 53 |
| Dimethyl | 61–62 |
| Dibutyl | 66–67 |
| Diisopropyl | 137 |
| Diethyl | 77 |
| Dipropyl | 71 |

In contrast, the preferred alkylthiourea mixtures of the present invention, remain liquid indefinitely at temperatures of 0° C. and even lower.

At each occurrence throughout this specification "liquid mixture" means a mixture capable of remaining pourable and essentially in the liquid state at atmospheric pressure and at a temperature of about 25° C. for at least one week in the absence of agitation and without the addition of solvent. By "a liquid mixture stable at low temperature" is meant a mixture capable of remaining pourable and essentially in the liquid state at atmospheric pressure and at a temperature of about 0° C. for at least one week in the absence of agitation and without the addition of solvents.

By approximately equal molar quantities of the reactants is meant from about two-thirds to one and one-half moles of butyl amine to each mole of ethyl amine. More preferred are reaction mixtures containing from about 0.9 to 1.1 moles of butylamine per mole of ethylamine. The most preferred reaction mixtures will contain equal molar quantities of ethylamine and butylamine. In all cases the reaction mixture will contain carbon disulfide preferably in amounts stoichiometric for the reaction.

The reaction will preferably be carried out in the liquid phase. The preferred reaction temperature range will be from about 0° C. to about 100° C. with the most preferred range being from about 10 to about 50° C. The pressure is not critical and may be from 0.1 to about 1000 atmospheres with approximately atmospheric pressures being preferred. Reaction times will be from one minute to as long as several days with reaction times on the order of 15 minutes to two hours being preferred. The reaction can be either continuous or can be performed on a batch basis.

The reactants will generally be of commercial purity. No catalyst is required although catalyst may be found useful under certain circumstances. Similarly, reaction media, while not necessary to the practice of the invention, may be found useful under special conditions.

After the carbon disulfide has been added, the amine mixture will preferably be heated in order to split off $H_2S$ according to the reaction equations given above. Final temperature will preferably be above 75° C. with final temperatures of from 100° C. to 150° C. being most preferred.

In a typical embodiment of the invention, the alkyl amines to be reacted will be mixed together and placed in a reaction vessel. The reaction mixture will then be maintained at about 10 to 50° C. and the carbon disulfide will be added slowly over a period of about 30 minutes. After the reaction is complete, the reaction mass will be warmed slowly to a temperature of about 135° C. in order to split out hydrogen sulfide. This will generally be followed by an aeration of about 30 minutes in order to rid the products of dissolved $H_2S$.

A typical final product has a specific gravity at 25° C. of approximately 1.005, and a yellow color. Yields of alkylthioureas are, in general, excellent, usually of the order of 98% or better.

The following examples will serve to illustrate the invention but should not be taken to limit it in any respect.

*Example 1.—Preparation of liquid mixture stable at low temperature from reaction mixture containing approximately one mole of monobutylamine per mole of monoethylamine*

2 moles (146.3 grams) of monobutylamine and 2 moles (90.1 grams) of monoethylamine are charged to a 1 liter, 3-necked flask fitted with a sub surface charging line, reflux condenser, thermometer, and vent leading to a hood. The flask is placed in an ice bath. Two moles (152 grams), of carbon disulfide are added slowly, keeping the temperature of the batch between 20 and 40° C. When the addition is complete, the flask and contents are warmed slowly to split off $H_2S$. The maximum temperature reached during warming is 135° C. When this temperature is reached, a 30 minute aeration period is employed to rid the contents of residual amounts of $H_2S$.

The final color of the batch is yellow. The yield is 98% of liquid dialkylthiourea mixture having the following analysis.

Theoretical: N, 17.5; S, 20.0. Found: N, 17.4; S, 19.6.

The dialkylthiourea mixture formed in this example is chilled and stored at −2° C. Observation after twelve days indicates no crystals or other solids and the mixture remains readily pourable.

At 20–25° C., no crystals or other solids are present after six months.

*Example 2.—Preparation of liquid N,N-dialkylthiourea mixtures from reaction mixture containing ⅔ mole of monobutylamine per mole of monoethylamine*

1.6 moles (117 grams) of monobutylamine and 2.4 moles (108 grams) of monoethylamine are charged to a 1 liter, 3-necked flask fitted with a sub surface charging line, reflux condenser, and a vent leading to a hood. The flask is placed in an ice bath. 2 moles (152 grams) of carbon disulfide while the temperature of the batch is maintained at between 10 and 30° C. The addition is complete, the flask and contents are warmed slowly to split off $H_2S$. The final temperature during the warming period reaches 135° C. A 30 minute aeration period is then used to rid the batch of minute quantities of $H_2S$. The final product has the following analysis.

Theoretical: N, 17.3; S, 19.75. Found: N, 17.7; S, 20.9.

The specific gravity of the final product is 1.010 at 25° C.

When the product from the above reaction is chilled to −2° C. a small amount of crystals are formed in 1 day. When held at room temperature (20–25° C.) no crystals or other solids are formed in 6 months.

*Example 3.—Preparation of liquid dialkylthiourea mixtures from reaction mixture containing 1.5 moles of monobutylamine per mole of monoethylamine*

2.4 moles (175.5 grams) of monobutylamine and 1.6 moles (72.2 grams) of monoethylamine are charged to a 1 liter, 3-necked flask fitted with a sub surface charging line, reflux condenser, thermometer and a vent leading to a hood. The flask is placed in an ice bath. 2 moles (152 grams) of carbon disulfide are added slowly while the temperature is maintained at between 20 and 40° C. After the addition is complete the flask and contents are warmed slowly to a maximum temperature of 137° C. to split out $H_2S$. A final 30-minute aeration period is used to rid the contents of minute amounts of $H_2S$. The final product is a liquid with a specific gravity of 1.00 at 25° C., is light amber in color and has the following analysis.

Theoretical: N, 16.9; S, 19.3. Found: N, 16.6; S, 19.1.

When the mixture produced by the above reaction is chilled to −2° C. crystals are formed within two days. When held at room temperature (20–25° C.) no crystals or other solids are formed in 6 months.

*Example 4.—Preparation of dialkylthiourea mixture from reaction mixture containing 3 moles of n-butylamine per mole of monoethylamine*

Three moles of n-butylamine and 1 mole of ethylamine are mixed and reacted with 2 moles of carbon disulfide according to the procedure of Example 1.

The product obtained is initially liquid and free of crystals but substantial crystallization occurs on standing at room temperature for 2 days.

*Example 5.—Preparation of dialkylthiourea mixture from reaction mixture containing one-third moles of monobutylamine per mole of monoethylamine*

According to the precedure of Example 1, one mole of n-butylamine is mixed with 3 moles of monoethylamine and reacted with 2 moles of carbon disulfide. A liquid product is obtained in 98.6% yield but the product undergoes substantialy crystallization on storage at room temperature for two days.

*Example 6.—Attempted preparation of stable liquid dialkylthiourea mixtures from isopropyl amine and butyl amine*

2 moles (146.3 grams) of monobutylamine and 2 moles (118.2 grams) of monoisopropylamine were charged to a 1 liter, 3-necked flask, reflux condenser, thermometer and a vent leading to a hood. The flask was placed in an ice bath. Two moles (152 grams) of carbon disulfide were added slowly keeping the temperature between 10 and 40° C. After the addition was complete the flask and contents were warmed slowly to a maximum temperature of 135° C. in order to split off $H_2S$. A final 30-minute aeration was employed to purge $H_2S$ from the product mixture.

The final product was a light yellow liquid but it did not remain liquid and solidified within a few hours at normal room temperature.

*Example 7.—Attempted preparation of stable liquid dialkylthiourea mixtures from isopropylamine and ethylamine*

An attempt was made to react to 1 mole of monoisoproylamine and 1 mole of monoethylamine with 1 mole of carbon disulfide. During the addition, the reaction mass became solid and could not be stirred.

*Example 8.—Attempted preparation of stable liquid dialkylthiourea mixture from ethylamine and propylamine*

When approximately equimolar quantities of ethylamine, propylamine and carbon disulfide are reacted with one mole of carbon disulfide, the resulting mixture does not remain liquid.

The preceding examples are intended solely to illustrate the invention and the surprising criticality of certain features of the practice thereof. The examples should be taken in no way to limit the scope of the invention or to exclude any of the many modifications and variations which may be made without departing from the spirit of the invention.

I claim:
1. Liquid mixtures consisting essentially of N,N'-dialkylthioureas having alkyl groups selected from the class consisting of ethyl, and normal butyl groups and capable of remaining pourable and essentially in the liquid state at atmospheric pressure and at a temperature of about 25° C. for at least one week in the absence of agitation and without the addition of solvents.

2. Liquid mixtures stable at low temperatures consisting essentially of N,N'-dialkylthioureas having alkyl groups selected from the class consisting of ethyl and butyl groups and capable of remaining pourable and essentially in the liquid state at atmospheric pressure and at a temperature of about 0° C. for at least one week in the absence of agitation and without the addition of solvents.

3. As a new composition of matter, a mixture of thioureas which is liquid at about 25° C. and consists essentially of N,N'-dialkylthioureas having alkyl groups selected from the class consisting of ethyl and butyl groups, said mixture being prepared by the method comprising reacting a mixture consisting essentially of butylamine and ethylamine in a ratio of from about two-thirds to one and one-half moles of butylamine to one mole of ethylamine with carbon disulfide at a temperature in the range of from about 0° C. to about 150° C. and removing hydrogen sulfide from the reaction mass.

4. The mixture according to claim 3 wherein the ratio of butylamine to ethylamine is from about 0.9:1 to 1.1:1.

References Cited by the Examiner

UNITED STATES PATENTS

| | | | |
|---|---|---|---|
| 2,840,610 | 6/1958 | Pullig | 252—391 XR |
| 2,885,421 | 5/1959 | Spiegler | 252—402 XR |
| 3,133,028 | 5/1964 | Channabasappa | 252—391 XR |

LEON D. ROSDOL, *Primary Examiner.*

ALBERT T. MEYERS, *Examiner.*

M. WEINBLATT, *Assistant Examiner.*